Patented Feb. 1, 1938

2,106,753

UNITED STATES PATENT OFFICE 2,106,753

ELECTRIC DISCHARGE TUBE OR LAMP

Anton Lederer, Vienna, Austria; Catherine Danzer and General Conrad Randa, executors of said Anton Lederer, deceased, assignors to Ernest Anton Lederer, Glen Ridge, N. J.

No Drawing. Application January 14, 1931, Serial No. 508,801. Renewed May 15, 1936. In Austria June 27, 1930

26 Claims. (Cl. 250—27.5)

This invention relates to electric discharge tubes or lamps. For obtaining particular light phenomena from electric gaseous glow discharge or arc discharge it is necessary to coat one or more electrodes of a gas-filled discharge tube or lamp with electron-emitting substances in order to obtain the desired luminous effects at a relatively low temperature but in contrast to tubes for wireless telegraphy and telephony an ionization taking place of the gases and/or vapours contained in the vessel. As a matter of course, the substances employed must be heated by suitable means in order to render them effective. Therefore, there are differences in the requirements as compared to the known methods and electrodes of the high vacuum art, because in the case of gas-filled discharge tubes or lamps special precautions must be taken, which insure prompt, reliable and uniform operation. In this connection it is inter alia an important point that the electron-emissive substances applied in the tube or lamp are in such a condition or state that a separation of gases or vapours therefrom is not easily possible. This is necessary for the reason that with such luminescent discharge tubes or lamps any contamination of the gas and/or vapour filling must be avoided under all circumstances.

Since Wehnelt's proposals alkaline earth and other oxide coatings for electron-emitting hot electrodes have become common knowledge. It has furthermore been proposed to employ barium peroxide and by separation of one half of its oxygen to convert it to barium oxide.

The present invention is based on the knowledge that it is not sufficient to use these and similar peroxides as such, but that it is necessary to convert them into a stable state, if such hot electrodes and particularly cathodes are to be used in gaseous discharge or luminescent tubes. If these oxides, particularly the barium peroxide or barium oxide, are converted into stable condition, there is little danger of a further contamination of the gas filling, a feature which, with the gas-tubes referred to, is of great importance. This stable form or state is different from the customary form used with high vacuum electron tubes. It is true that there are certain oxides of other materials which are also refractory and which do not give off oxygen at all or only with difficulty but they do not possess the favourable property of a high emission of electrons as do those substances produced from barium peroxide as original material and treated according to the present invention.

These advantageous properties of the coating are obtainable by sufficient heating in a particular manner with the simultaneous removal of the heating products and thus leading to a definite stable final product. This latter, after completion of the heating or "activation" process, probably contains in all cases metallic barium or at least barium sub-oxide besides, and in some cases other emitting oxides which may have been added or the decomposition products thereof, or the equivalent elements or compounds of the group of the alkaline earth metals.

If barium peroxide is used alone, one obtains after treatment according to the present invention a distinct departure from the white colour of the peroxides of the alkaline earth metals, and particularly a characteristic brownish coloured product which apparently consists of barium metal and at least barium suboxide. This colouration seems to be an essential condition in order to obtain a refractory coating resistant to gaseous or arc discharges even in cases where other permanent or stable oxides had been originally included. It is not sufficient for gas-filled discharge or luminescent tubes to use ordinary oxide coatings which are brought to luminescence chiefly by an arc discharge, but it is necessary that at least the darker coloured barium oxide or barium metal component must be distinctly visible and noticeable, and by this characteristic this coating is believed to be distinct from the customarily applied white coatings.

The reaction product obtained which, in all probability, contains metallic barium, probably also contains barium suboxide, as such is described as a brown substance in a treatise "Sur la Préparation du Baryum" by M. A. Guntz Annales de Chimie et de Physique 1907, (8) (10), P. 437 ff.).

It is possible that the brownish coating substance above set forth may be usefully employed for cathodes of tubes for wireless telegraphy and telephony.

The product above set forth has the property of reducing to the metal certain oxides capable of participating in the emission of electrons. Thus, for instance, said product converts thorium oxide into highly emitting thorium metal which, being not generally subjected to more than about 1000° C. at the operation temperature of the discharge tubes, can form a heat resisting and adherent coating of the electrode surface.

Zirconium oxide, which is not reduced by barium, remains unchanged. However, inasmuch as zirconium oxide which, as is known, is also an emitting substance, does not give off oxygen and therefore does not cause any contamination, it cannot become undesirable for the rare gas or gases contained in the tube.

In carrying out the invention, care should be taken that the formation and pyrogenous development of the sub-oxide of barium and/or barium metal, namely of the substance characterized above takes place through its colour change.

For tubes for wireless telegraphy and telephony it has been proposed to introduce into the tube itself the metallic electron emitting substances and then to cause them to deposit on the metal parts. However, for the purpose of the present invention such process cannot be employed, because not only are the required electrode or electrodes thereby covered with the metallic deposit but also the whole of the interior surfaces of the tube.

In order to produce suitable coatings which remain stable during a long period of gaseous or arc discharges, for instance of hundreds of hours duration, it is beneficial to utilize basic material of suitable form and properties. Always bearing in mind the aforesaid final form of the coating, the aim is to select a condition of the basic or original materials such as to insure a stable solid and durable coating. If, therefore, the peroxides employed are applied alone or as a mixture, they preferably have a certain particle size, namely, the size of the particles should on an average be 0.004 mm. diameter or even less, this being an order of size where Brownian molecular movement of the suspended particles can set in.

Such fine division of the peroxides of barium, strontium or calcium, with which if desired may be mixed also other emitting oxides having certain qualities, as aforementioned, may be achieved by grinding and, if desired, subsequent levigation. During all these operations care should be taken to work as far as possible under exclusion of air, carbon dioxide, water and water vapour.

The following is an example of carrying out to good effect the process of the present invention, using barium peroxide as the original or basic material. The barium peroxide is finely ground, conveniently in wet condition, it being advantageous to use amylacetate as a suspension liquid. To insure firm adherence of such a suspension on the emitting body, such as a nickel tube adapted to be indirectly heated, a small quantity of a solution of colloidin may be added. For instance, three parts barium peroxide, 20 parts amylacetate and ½ part of a 10% solution of colloidin in acetone are well ground in such a way that the particle size is on an average below 0.004 mm. diameter, which may be achieved by very slow grinding and subsequent filtering through a suitable filter. If this suspension is finely sprayed on to the electrode or electrodes, care being taken that one layer is dry before the next one is applied, useful layers of several hundredths to one tenth mm. thickness may readily be obtained. After the electrode or the electrodes thus manufactured is or are built in into the tube and the latter is subjected to the usual preliminary heating or baking at a temperature of about 400° whilst being exhausted by a good vacuum pump, preferably to a high vacuum, the activation of the coating may be caused to set in, and it will be observed that when carefully further heating, next to about from 600° to 800° C. a gaseous discharge will take place, this being the temperature at which some of the oxygen of the barium peroxide escapes. By a further increase of temperature to probably about 1000° C. the remaining oxygen may at least in part be removed. Finally, the temperature of the electrode or the electrodes is increased to nearly the melting temperature of nickel. It will be observed that the originally white coating becomes darker and apparently begins to flow. The heating should be then stopped. A coating of a dark brown colour will be left on the electrode or electrodes which coating does not give off any further gas which coating is the desired one and is stable even in a gaseous discharge or arc.

After the tube is furnished with the filling gas, for instance, neon at a pressure of about 1 to 10 mm. mercury column, the necessary operating voltage may be applied depending upon the construction or operating constants of the tube, whereupon, when the hot electrodes are sufficiently heated the gaseous or arc discharge sets in accompanied by an intense light phenomenon.

In order to ensure a reliable and durable adherence of the coating to the carrier it is advisable in some cases to add to the electron emitting main compound a small quantity of a highly infusible metal or of a decomposable compound thereof, whereby to provide a better adherence. For instance, for such purpose with the abovementioned 3 parts of barium peroxide, 0.2 part of nickel oxide may be admixed. Other substances may be incorporated into the basic substance without damaging the emission effect which in some cases may thereby be even favourably influenced.

Some finely divided thorium oxide may be admixed with the basic substance, namely, in the above example, barium oxide. Thus an equal quantity or preferably one-third of the quantity (of the peroxide used) of thorium oxide may be added and then one may proceed as above described. It will be observed that by the presumed formation of barium metal and/or barium suboxide, a reduction of the thorium oxide also takes place, the latter being reduced to thorium metal which has a favourable electron emission, as is known, and allows of a relatively high heating of the coating.

The coating which was originally white and subsequently becomes of a dark brown colour, regarding the formation of barium metal and/or barium suboxide, reduces the thorium oxide present to thorium metal and by further heating and decomposition of the barium oxide the released barium metal alloys with the thorium metal forming a good, electron emitting, firmly adherent layer of almost black colour.

Other emitting oxides also may be admixed with the basic metal but care should be taken to use only such oxides or compounds which after the glowing operation are no longer decomposable at the temperatures used. For instance, zirconium oxide may be used, which substance remains in the coating unaltered. The amount of such addition may be approximately equal to the amount of the addition of thorium oxide.

Also cerium oxide, when added in small quantities seems to influence the gaseous or arc discharge favourably, although the amount of the addition may be very small. A few tenths of a part of cerium oxide are sufficient for admixing with 3 parts of the original peroxide in order to obtain favourable effects.

It is evident that many other variations are possible, if the active oxides as indicated by Wehnelt are considered and used, in which connection as a matter of course calcium and strontium and their compounds are to be taken into consideration. Such active oxides are enumerated in Wehnelt's treatise: "Ueber den Austritt negativer Ionen aus glühenden Metallverbindungen und damit zusammenhängende Erscheinungen." (The Exit (Emission) of Ions from Glowing Metal Compounds and Phenomena Connected Therewith.) Annalen d. Physik, IV. Folge, 1904, No. 8, p. 429.

The emitting substances described can also be used on cathodes of tubes employed for wireless telegraphy and telephony.

I claim:—

1. Steps in the production of an electric illuminating lamp having at least two electrodes of which at least one is adapted to emit electrons when heated, and a pure filling of at least a monatomic or rare gas which consists in coating said electron emitting electrode with a layer at least containing barium peroxide, mounting the electrodes in the vitreous bulb of the lamp, evacuating said bulb, heating said electron emitting electrode for several minutes at approximately from 600° to 800° C., and whilst still maintaining the vacuum heating the electron emitting electrode for a relatively short time to approximately 1200° C. so that the coating assumes essentially a dark brown colour, and finally introducing the rare or monatomic gas.

2. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating while the same is being exhausted, and then, whilst maintaining the vacuum, subjecting the emitting electrode to heat treatments at temperatures successively increased to nearly the melting temperature of nickel.

3. A method for the production of an electric discharge tube having at least two electrodes of which at least one is adapted to emit electrons when heated, which comprises providing said electron emitting electrode with a coating at least containing barium peroxide the average size of the particles of which is sufficiently small that it exhibits Brownian movements, mounting said emitting electrode in a tube, exhausting said tube to a relatively high vacuum, subjecting said tube to preliminary heating while the same is being exhausted, and then, whilst maintaining the vacuum, subjecting the emitting electrode to heat treatments at temperatures successively increased to nearly the melting temperature of nickel.

4. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating while the same is being exhausted, subjecting the emitting electrode, while maintaining the vacuum, to further heat treatment at about 600° to 800° C. to remove oxygen from the peroxide, and then, whilst still maintaining the vacuum, subjecting the emitting electrode to heat treatments at temperatures successively increased to nearly the melting point of nickel.

5. A method for the production of an electric discharge tube having at least two electrodes of which at least one is adapted to emit electrons when heated, which comprises providing said electron emitting electrode with a coating of least containing peroxide of an alkaline earth metal, mounting said electrode in a tube, exhausting said tube to a relatively high vacuum, subjecting said tube to preliminary heating while the same is being exhausted, and then, whilst maintaining the vacuum, subjecting the emitting electrode to heat treatments at temperatures successively increased to nearly the melting point of nickel.

6. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating while the same is being exhausted, whilst maintaining the vacuum subjecting the emitting electrode to heat treatments at temperatures successively increased to remove oxygen from the peroxide, and then, whilst still maintaining the vacuum, subjecting the emitting electrode to a heat treatment at a temperature nearly the melting point of nickel.

7. A method for the production of an electric discharge tube having at least two electrodes of which at least one is adapted to emit electrons when heated, which comprises providing said electron emitting electrode with a coating at least containing barium peroxide, mounting said electrode in a tube, exhausting said tube to a relatively high vacuum, subjecting said tube to preliminary heating of about 400° C. while the same is being exhausted, whilst maintaining the vacuum subjecting the emitting electrode to two successive heat treatments one at a temperature of about 600° C. to 800° C. and the other at about 1000° C. to remove oxygen from the coating, and then, whilst still maintaining the vacuum, subjecting the emitting electrode to a heat treatment at a temperature near the melting point of nickel.

8. Steps in the production of an electric discharge tube having at least two electrodes, of which at least one is adapted to emit electrons when heated, which consist in coating said electron emitting electrode with a layer at least containing barium peroxide, mounting the electrodes in a tube, heating said electrode in a maintained vacuum for a relatively long time at a moderate temperature sufficient to remove oxygen slowly from the barium peroxide, and then, whilst maintaining the vacuum, heating the electrodes for relatively short periods at temperatures sufficiently increased that further oxygen will be removed from the coating, the final heating being at nearly the melting point of nickel.

9. A process of making a thermionic active electrode which comprises supplying a coating containing barium peroxide to an electrode, said peroxide being employed in a finely ground condition suspended in amyl acetate, said amyl acetate having added thereto a solution of colloidin, the particles of barium peroxide being on the average below 0.004 mm. in diameter, the resulting suspension being sprayed on the surface of the electrode, applying it in layers and allowing each layer to dry before applying the next until the coating is of sufficient thickness, thereupon building the electrode into a vessel, evacuating the latter to a high vacuum while heating the electrode to a temperature approximating 400° C., thereupon, whilst retaining the vacuum, raising the temperature progressively until oxygen escapes from the peroxide and finally, whilst still retaining the vacuum, increasing the temperature until the coating assumes a brownish color.

10. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 2.

11. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 3.

12. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 4.

13. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 5.

14. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 6.

15. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 7.

16. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 8.

17. An electric discharge device having at least two electrodes of which at least one is adapted to emit electrons when heated, said emitting electrode comprising a carrier adapted to be heated, and an emitter formed from barium peroxide and applied to said carrier and activated in accordance with the process set forth in claim 9.

18. A method for the production of an electric discharge device having at least two electrodes of which at least one is adapted to emit electrons when heated, which comprises providing said electron emitting electrode with a coating containing barium peroxide, mounting said electrode in a tube, exhausting said tube to a relatively high vacuum, subjecting said tube to preliminary heating while the same is being exhausted, and then, whilst maintaining the vacuum, subjecting the emitting electrode to heat treatments at temperatures successively increased at least to nearly the melting point of nickel.

19. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 18.

20. A method for the production of an electric discharge device having at least two electrodes of which at least one is adapted to emit electrons when heated, which comprises providing said electron emitting electrode with successive coatings containing barium peroxide in suspended form, each coating being dried before the next coating is applied, mounting said electrode in a tube, exhausting said tube to a relatively high vacuum, subjecting said tube to preliminary heating while the same is being exhausted, and then, whilst maintaining the vacuum, subjecting the emitting electrode at least to heat treatment at a temperature at least to nearly the melting point of nickel.

21. A method for the production of an electric discharge device having at least two electrodes of which at least one is adapted to emit electrons when heated which comprises the step of coating said emitting electrode with a layer containing barium peroxide in finely divided suspended form, the particle size being sufficiently small that Brown's molecular movement can take place, mounting said electrode in a tube, exhausting said tube to a relatively high vacuum, subjecting said tube to preliminary heating while the same is being exhausted, and then, whilst maintaining the vacuum, subjecting the emitting electrode to heat treatment at a temperature at least to nearly melting point of nickel.

22. A method for the production of an electric discharge device having at least two electrodes of which at least one is adapted to emit electrons when heated, which comprises providing said electron emitting electrode with successive coatings containing barium peroxide in finely divided form, the particle size being sufficiently small that Brown's molecular movement can take place and each coating being dried before the next coating is applied, mounting said electrode in a tube, exhausting said tube to a relatively high vacuum, subjecting said tube to preliminary heating while the same is being exhausted, and then, whilst maintaining the vacuum, subjecting the emitting electrode to heat treatment at a temperature increased at least to nearly melting point of nickel.

23. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 20.

24. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 21.

25. An electric discharge device having at least two electrodes of which at least one is adapted to emit electrons when heated, said emitting electrode comprising a carrier adapted to be heated, and an emitter formed at least from barium peroxide and applied to said carrier and activated in accordance with the process set forth in claim 22.

26. An electric discharge device having at least two electrodes of which at least one is adapted to emit electrons when heated, said emitting electrode comprising a carrier adapted to be heated, and an emitter formed at least from a peroxide of an alkaline earth metal and applied to said carrier and activated in accordance with the process set forth in claim 5.

ANTON LEDERER.